United States Patent [19]

Kinoshita et al.

[11] Patent Number: 4,887,160
[45] Date of Patent: Dec. 12, 1989

[54] IMAGE-PICKUP DEVICE AND SYSTEM CAPABLE OF OUTPUTTING EITHER COMBINED (HIGH BAND) OR SEPARATE (LOW BAND) SIGNALS

[75] Inventors: Takao Kinoshita, Tokyo; Akihiko Tojo, Yokohama, both of Japan

[73] Assignee: Canon Kabushiki Kaisha, Tokyo, Japan

[21] Appl. No.: 364,501

[22] Filed: Jun. 9, 1989

Related U.S. Application Data

[63] Continuation of Ser. No. 877,851, Jun. 24, 1986, abandoned.

[30] Foreign Application Priority Data

Jul. 8, 1985 [JP] Japan .................................. 60-149478

[51] Int. Cl.$^4$ .................................................. H04N 3/14
[52] U.S. Cl. ................................. 358/213.26; 358/44; 358/213.27; 358/213.31; 357/24
[58] Field of Search ...................... 358/213.26, 213.27, 358/213.28, 213.29, 213.31, 41, 43, 44; 357/24 LR

[56] References Cited

U.S. PATENT DOCUMENTS

| | | | |
|---|---|---|---|
| 4,001,878 | 1/1977 | Weimer | 357/24 LR X |
| 4,151,553 | 4/1979 | Sugihara | 358/44 |
| 4,438,457 | 3/1984 | Tandon et al. | 358/213.26 |
| 4,486,783 | 12/1984 | Tanaka et al. | 358/213 |
| 4,500,914 | 2/1985 | Watanabe et al. | 358/44 |
| 4,513,313 | 4/1985 | Kinoshita et al. | 357/24 LR X |
| 4,551,758 | 11/1985 | Masunaga et al. | 358/213 |
| 4,553,159 | 11/1985 | Moraillon | 358/44 |
| 4,553,167 | 11/1985 | Kinoshita | 358/213 |
| 4,573,076 | 2/1986 | Tisue et al. | 358/213 |
| 4,580,160 | 4/1986 | Ochi et al. | 358/48 |
| 4,589,026 | 3/1986 | Ozawa et al. | 358/213.27 X |
| 4,603,354 | 7/1986 | Hashimoto et al. | 358/213 |
| 4,635,122 | 1/1987 | Kato et al. | 357/24 LR X |
| 4,638,352 | 1/1987 | Noda et al. | 358/43 X |
| 4,641,183 | 2/1987 | Kinoshita | 358/41 X |
| 4,649,430 | 3/1987 | Hynecek | 358/213.25 X |
| 4,656,503 | 4/1987 | Hynecek | 358/44 |
| 4,660,090 | 4/1987 | Hynecek | 358/213.25 X |
| 4,734,589 | 3/1988 | Atherton | 358/213.27 X |
| 4,737,854 | 4/1958 | Tandon et al. | 358/213.31 |
| 4,780,764 | 10/1988 | Kinoshita et al. | 358/213.26 A |
| 4,816,910 | 3/1989 | Hashimoto et al. | 358/213.27 |
| 4,827,345 | 5/1989 | Nakagawa et al. | 358/213.27 |

FOREIGN PATENT DOCUMENTS

| | | | |
|---|---|---|---|
| 53-139428 | 5/1978 | Japan | 358/50 |
| 58-172085 | 10/1983 | Japan | 358/44 |

OTHER PUBLICATIONS

Kam Li, "High Density Charge Coupled Device for Linear Image Sensor", Xerox Disclosure Journal, Sep.-/Oct. 1977, pp. 83, 84.

Primary Examiner—James J. Groody
Assistant Examiner—Mark R. Powell
Attorney, Agent, or Firm—Fitzpatrick, Cella, Harper & Scinto

[57] ABSTRACT

An image pickup device in which a plurality of radiation sensitive devices are divided into plural groups. There are provided first read-out means which separately read out the signals from respective groups of the cells, and second read-out means which serially reads out the signals from the respective cells. It is possible to produce color component signals through the first read-out means while producing high range image signals through the second read-out means. The cells and the first and the second read-out means are formed on a common semi-conductive body.

8 Claims, 6 Drawing Sheets

IMAGE-PICKUP DEVICE AND SYSTEM CAPABLE OF OUTPUTTING EITHER COMBINED (HIGH BAND) OR SEPARATE (LOW BAND) SIGNALS

This application is a continuation of application Ser. No. 877,851, filed June 24, 1986, now abandoned.

BACKGROUND OF THE INVENTION

1. Field of the Invention

The present invention relates to an image pickup device and an image pickup system, and more particularly to an image pickup device having multiple read-out or output channels and an image pickup system using the same.

2. Description of the Related Art

In the field of color image pickup, there has been proposed a color image pickup device, such as CCD, having multiple read-out or output channels each for outputting a different color signal.

Also it is known to form a high range luminance component by dot seriating the color signals obtained through respective signal channels in signal processing circuits.

When the high range luminance component is to be formed by dot seriating the color outputs respectively obtained through the multiple output channels of the pickup device, a dot seriating switch circuit should be provided which is controlled in accordance with the signal reading out through each output channel of the pickup device.

However, due to the time delay of the control signals by the circuit, it is apt to create a timing discordance between the switching of the color outputs by the switch circuit and the signal reading out through the read-out or output channels.

Such timing discordance may also be created by temperature changes or by voltage changes between the pickup device and the switch circuit.

Moreover, if there should be any timing discordance between the switching of the color outputs and the reading out of the signal, the level of the high range luminance component obtained by the switching of the color outputs would fluctuate and color noise would be generated.

SUMMARY OF THE INVENTION

According to one aspect of the present invention, there is provided an image pickup device which comprises a semi-conductive body, a plurality of radiation sensitive cells, a plurality of read-out channels and a selecting circuit. Each of the sensitive cells generates an electrical signal in response to received radiation. Each of the read-out channels has a corresponding output and is arranged to read out the signals generated by the cells to produce the signals at its corresponding output. The selecting circuit has a selecting circuit output and is arranged to select the signals read out through the read-out channels to produce the selected signals at its output. All of the sensitive cells, the read-out channels and the selecting circuit are formed on the semi-conductive body.

In a preferred embodiment of the present invention, the sensitive cells are arranged in rows and columns and to generate electrical charges. Each of the read-out channels may include a charge transfer register. Each register may be provided with a charge-to-voltage conversion part at its output part or stage. The selecting circuit may be connected to the conversion parts. The selecting circuit may include switches such as FETs having one common output and individual inputs respectively connected to the conversion parts.

According to another aspect of the present invention, there is provided an image pickup device which comprises a semi-conductive body, a plurality of radiation sensitive cells, first read-out means and second read-out means. The radiation sensitive cells are divided into plural groups and each cell generates an electrical signal in response to received radiation. The first read-out means reads out the signals from the cells of the same group, while the second read-out means reads out the signals from the cells of different groups. All of the sensitive cells, the first read-out means and the second read-out means are formed on the semi-conductive body.

In a preferred embodiment of the present invention, the first read-out means may include plural signal read-out channels respectively corresponding to the cell groups. The second read-out means can be arranged to sequentially select the signals read out through the read-out channels. The second read-out means may include select switches having one common output and individual inputs respectively connected to outputs of the read-out channels. Each of the sensitive cells may be arranged to generate an electrical charge; and the first read-out means may include charge transfer registers as the read-out channels and charge-to-voltage conversion parts at respective outputs of the registers. Each of the inputs of the switches in the second read-out means can be connected to one of the charge-to-voltage conversion parts.

The image pickup device may further comprise a color filter arrangement including different filter portions having different colors and placed on the sensitive cell array so that each portion corresponds to or covers one sensitive cell group.

With this color image pickup device, the different color signals can be obtained separately through the first read-out means and the dot seriated signal for the high range luminance component can be obtained through the second read-out means.

According to another aspect of the present invention, there is provided an image pickup device which comprises a plurality of radiation sensitive cells, a plurality of read-out channels, a selecting circuit and control signal paths. Each of the sensitive cells generates an electrical signal in response to received radiation. Each of the read-out channels has a corresponding output and is responsive to a control signal for reading out electrical signals generated by the cells to produce the electrical signals at its corresponding output. The selecting circuit has a selecting circuit output and is responsive to control signals for selecting the electrical signals read out through the read-out channels to produce the selected signals at its output. The control signal paths are common to the read-out channels and to the selecting circuit for supplying the control signals to the read-out channels and to the selecting circuit.

In a preferred embodiment of the present invention, the selecting circuit may include switches having one common output and individual inputs respectively connected to the outputs of the read-out channels; and each of the control signal paths can be connected to one of the read-out channel and to one of the switches. Each of the read-out channels may include a signal transfer register having a drive electrode; each off the switches may have a control terminal; and each of the signal paths can be connected to the electrode of one register and to the control terminal of one switch. Furthermore, all of the sensitive cells, the read-out channels, the selecting circuit and the control signal paths may be formed on a same semi-conductive body. The other possible or preferable arrangements of the sensitive cells, of the read-out channels and of the selecting circuit in this aspect of the present invention may be the same as in the first mentioned aspect of the present invention.

According to still another aspect of the present invention, there is provided an image pickup device which comprises a plurality of radiation sensitive cells, first read-out means, second read-out means and signal path means. The radiation sensitive cells are divided into plural groups and each cell generates an electrical signal in response to received radiation. The first read-out means is responsive to control signals and separately reads out the signals from the respective groups of the sensitive cell, while the second read-out means is responsive to control signals and serially reads out the signals from the respective cells. The signal path means is common to the first and the second read-out means for supplying the control signals.

In a preferred embodiment of the present invention, the possible or preferable arrangements of the sensitive cells, of the first read-out means and of the second read-out means in this aspect of the present invention may be the same as in the second mentioned aspect of the present invention on the other hand, the signal path means may include plural signal paths, each connected to one of the read-out channels or the registers in the first read-out means and to one of the selection switches in the second read-out means. All of the radiation sensitive cells, the first and the second read-out means, and the signal path means may be formed on a same semi-conductive body. Furthermore, the pickup device may further comprise the above described color filter arrangement.

According to a still further aspect of the present invention, there is provided an image pickup system which comprises an image pickup device and drive means. The image pickup device has a plurality of radiation sensitive cells, a plurality of read-out channels and a selecting circuit. Each of the sensitive cells, generates an electrical signal in response to received radiation. Each of the read-out channels reads out, in response to an applied drive signal, signals generated by the sensitive cells to produce signals at a corresponding output. The selecting circuit selects, in response to an applied drive signals, the signals read out through the read-out channels to produce the selected signals at its output. The drive means is arranged to apply drive signals in common to the read-out channels and to the selecting circuit.

In a preferred embodiment of the present invention, the image pickup device may further have signal paths common to the read-out channels and to the selecting circuit; and the drive means may be arranged to supply the drive signals to the read-out channels and to the selecting circuit through the signal paths. Furthermore, all of the sensitive cells, the read-out channels, the selecting circuit and any signal paths in the image pickup device may be formed on a same semi-conductive body. The outer possible or preferable arrangements of the sensitive cells, of the read-out channels, of the selecting circuit and of any signal paths in the image pickup device in this aspect of the present invention may be the same as in the first or the third mentioned aspect of the present invention.

According to a still further aspect of the present invention, there is provided an image pickup system which comprises an image pickup device and drive means. The image pickup device has a plurality of radiation sensitive cells and first and second read-out means. The sensitive cells are divided into plural groups and each cell generates an electrical signal in response to received radiation. The first read-out means is responsive to applied drive signals for separately reading out the signals from the respective groups of the sensitive cells, while the second read-out means is responsive to drive signals for serially reading out the signals from the respective cells. The drive means is arranged to apply drive signals in common to the first and the second read-out means of the image pickup device. In a preferred embodiment of the present invention, the possible or preferable arrangement of the sensitive cells and of the first and the second read-out means in the image pickup device in this aspect of the present invention may be the same as the second or the fourth mentioned aspect of the present invention. The image pickup device may further have signal path means common to the first and the second read-out means. The drive means can be arranged to supply the drive signals to the first and the second read-out means through the signal path means. The signal path means in this aspect of the present invention may be the same as in the fourth mentioned aspect of the present invention. Also, all of the sensitive cells, the first and the second read-out means, and any signal path means in the pickup device may be formed on a semi-conductive body. Furthermore, the pickup device may further include the above described color filter arrangement.

By the features of the above-mentioned aspects of the present invention, it becomes possible to maintain in good order the timing relationship between the signals obtained through the read-out channels or the first read-out means from the respective groups of the cells separately and the signals obtained through the selecting circuit or the second read-out means from the respective cells serially.

Accordingly, when the above-described pickup device or system is used for the color image pickup, the fluctuation in the level of the luminance signal and the color noise would be eliminated.

The above and further other aspects, features and advantages of the present invention will become apparent from the following detailed description of a preferred embodiment of the present invention referring to the attached drawing.

DETAILED DESCRIPTION OF THE PREFERRED EMBODIMENTS

In advance of the explanation of the preferred embodiments of the present invention, an example of the related art will be explained with reference to FIGS. 1 to 3.

Figure 1:
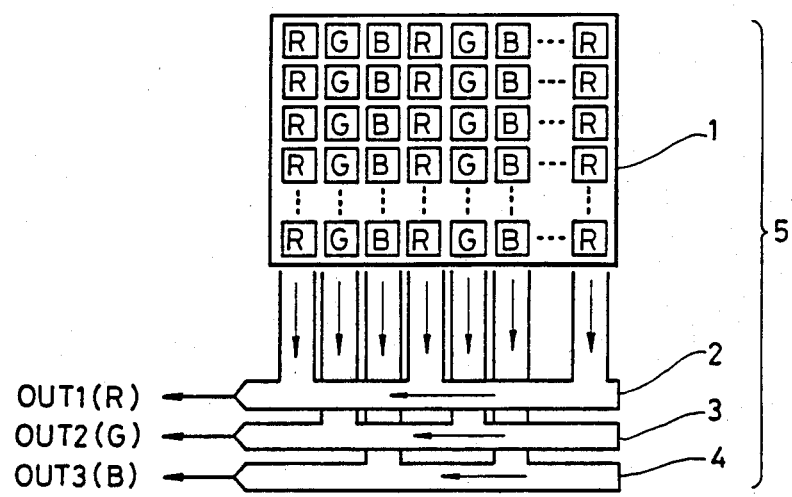
FIG. 1 is a schematic diagram showing one example of a known color CCD image pickup device having multiple read-out or output channels.

In FIG. 1, there is shown a color CCD image pickup device 5. This pickup device 5 comprises an image pickup part 1 having a matrix array of a plurality of radiation sensitive cells. Each cell produces and stores an electrical charge in response to received radiation. On the matrix array of the cells, there is provided a color filter arrangement having different color filter strip portions R (red), G (green) and B (blue) repeating in the named order from left to right in the Figure and placed on the matrix array of the cells in such a manner that each filter strip portion corresponds to one column array of the cells. Thus, the sensitive cells are divided into three groups according to the colors (R, G and B) of the filter strips.

The pickup device 5 further comprises three read-out or output channels (charge transfer shift registers) 2, 3 and 4 for reading out the charges from the respective groups (R, G and B) of the cells. Thus, the red (R), the green (G) and the blue (B) color signal charges generated at respective cell groups are respectively and separately read out through the channels (hereinafter shift registers) 2, 3 and 4. Each of the shift registers 2, 3 and 4 has a charge-to-voltage conversion part at its output (shown leftmost in the FIG. 1).

Although it is not shown in FIG. 1, the pickup device 5 may further comprise a storage part as a frame transfer type CCd imager between the image pickup part 1 and the shift registers 2, 3 and 4 for temporarily storing the charges generated at the image pickup part 1 for reading out.

This kind of CCD image pickup device having multiple read-out or output channels is described in U.S. Pat. No. 4,001,878 (Weimer) and No. 4,513,313 (Kinoshita et al.).

Figure 2:
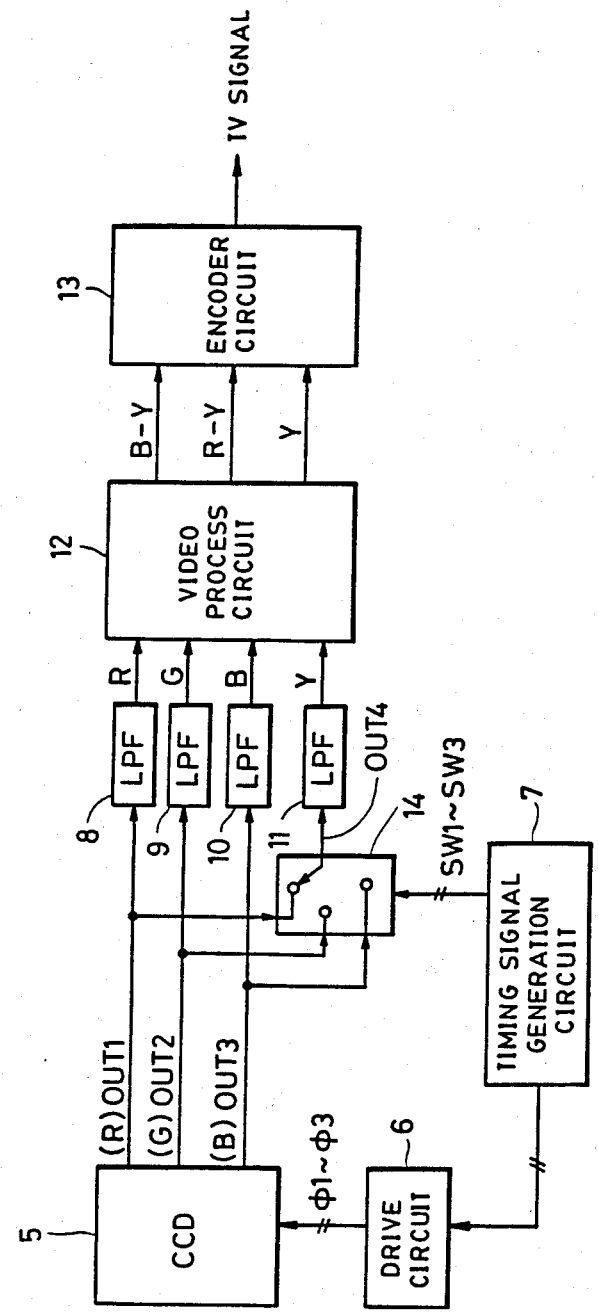
FIG. 2 is a block diagram showing one example of an image pickup system using the pickup device shown in FIG. 1.

Next, in FIG. 2 there is shown one example of an image pickup system using the image pickup device 5 shown in FIG. 1. A drive circuit 6 is connected to drive the pickup device 5 and supplies three phase drive pulses $\phi 1$, $\phi 2$ and $\phi 3$ thereto. A timing signal generation circuit 7 is connected to the drive circuit 6 and supplies reference timing signals thereto. Low-pass filters 8, 9 and 10 are connected to the outputs OUT1, OUT2 and OUT3 of the pickup device 5, respectively. A switching (or selecting) circuit 14 is connected between the three outputs OUT1, OUT2 and OUT3 of the pickup device 5 and the input of a low-pass filter 11. A video process circuit 12 is connected to receive the outputs of the low-pass filters 8, 9 10 and 11; and an encoder circuit 13 is connected to the output of the process circuit 12.

Next, the operation of the image pickup system of FIG. 2 will be explained. In response to the reference timing signals from the timing signal generating circuit 7, the drive circuit 6 supplies the image pickup device 5 with the three phase drive pulses $\phi 1$, $\phi 2$ and $\phi 3$ (having 120° phase difference from each other) shown in FIG. 3 to drive the three image pickup device shift registers 2, 3 and 4 (in FIG. 1) respectively. Thus, as is shown in FIG. 3, the image pickup device 5 produces three outputs OUT1, OUT2 and OUT3 corresponding to red, green and blue colors, respectively. These outputs OUT1, OUT2 and OUT3 have 120° phase difference from each other and are filtered at the low-pass filters 8, 9 and 10 to eliminate excess of unwanted high-range components, respectively and to produce color component signals R (red), G (green) and B (blue).

Figure 3:
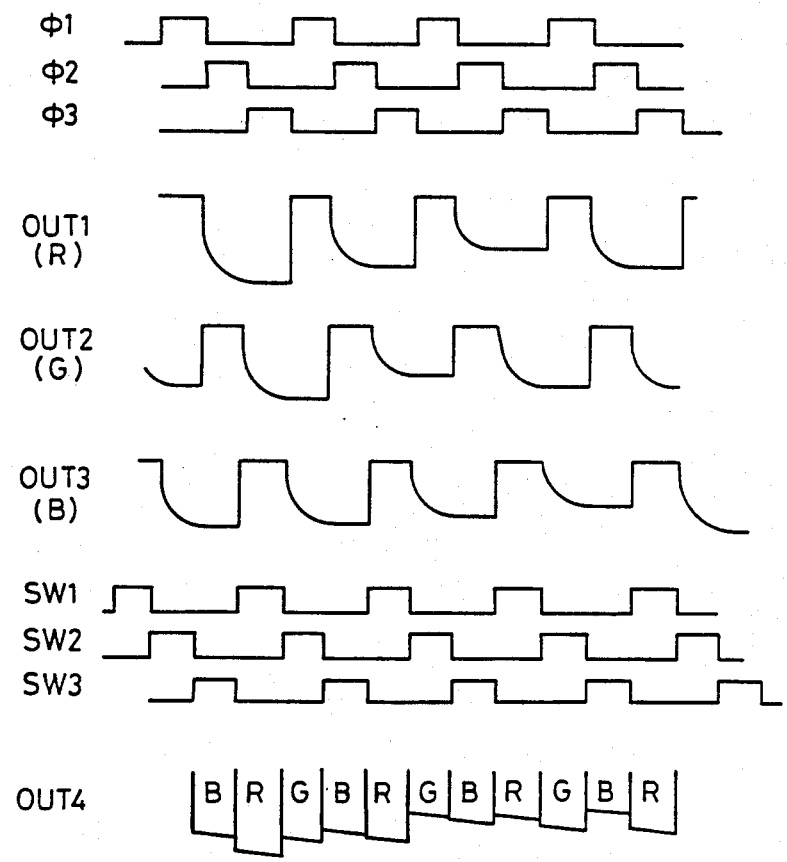
FIG. 3 is a timing chart showing the manner of operation of the system shown in FIG. 2.

The timing signal generation circuit 7 also supplies the switching circuit 14 with three phase switching pulses SW1, SW2 and SW3, shown in FIG. 3, to change over the switching circuit 14. The switching pulses have 120° phase difference from each other and 240° phase delay from the drive pulses $\phi 1$, $\phi 2$ and $\phi 3$, respectively. Thus, the switching circuit 14 selects each of the outputs OUT1, OUT2 and OUT3 in sequence in response to the switching pulses SW1, SW2 and SW3 and provides an output OUT4 shown in FIG. 3. The output OUT4 of the switching circuit 14 is filtered at the low-pass filter 11 having a cut-off frequency of 4 MHz, for example, to produce a high range luminance signal Y.

The color component signals R, G and B and the high range luminance signal Y are input to the video process circuit 12 and processed into color difference signals B-Y and R-Y and a luminance signal Y as is well known in the art. The video process circuit 12 also performs signal clamping, γ (gamma) correcting, white clipping, dark clipping and so on as is also well known in the art. The color difference signals B-Y and R-Y and the luminance signal Y are input to the encoder circuit 13 and are encoded to form a standard television signal.

The above described technique for forming a high range signal component by switching three (primary) color signal components is described in Japanese Patent Laid Open No. 139428/1978 and U.S. patent application Ser. No. 556,991 filed on Dec. 1, 1983 and assigned to the assignee of the present invention.

Next, the preferred embodiment of the present invention will be explained with references to FIGS. 4 to 6.

Figure 4:
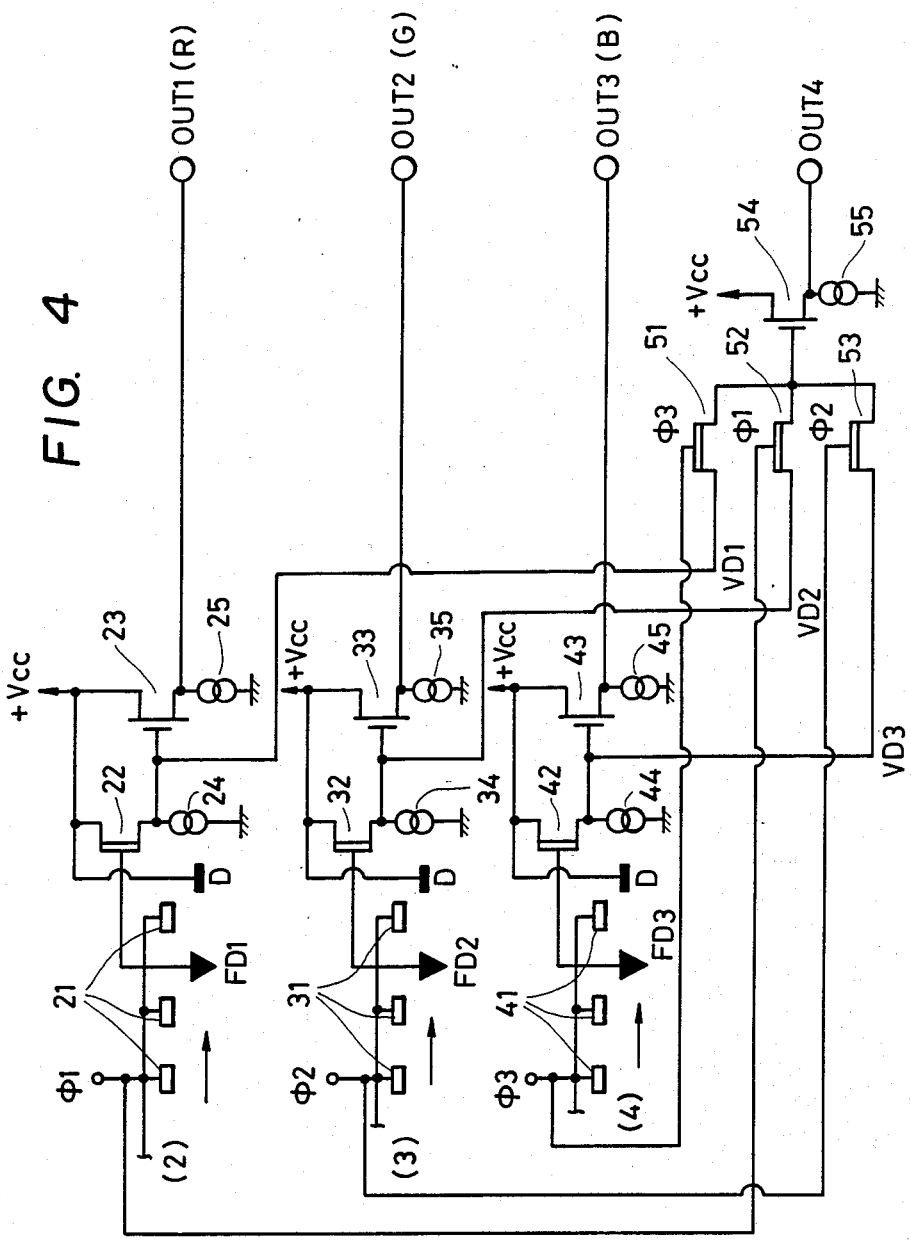
FIG. 4 is an equivalent circuit diagram which represents a portion of an image pickup device according to the present invention.

In FIG. 4, there are represented output parts or stages of the read-out or output shift registers 2, 3 and 4 of a CCD image pickup device according to the present invention.

The shift registers 2, 3 and 4 have respective drive electrodes, 21, 31 and 41 to which the drive pulses $\phi 1$, $\phi 2$ and $\phi 3$ are supplied, respectively. The shift registers 2, 3 and 4 also have, at their respective end stages, floating regions FD1, FD2 and FD3 and drains D, respectively. Buried channel type FETs (Field Effect Transistors) 22, 32 and 42 are connected at their gates to the floating regions FD1, FD2 and FD3 and at their sources to constant current sources 24, 34 and 44, respectively. Surface channel type buffer transistors 23, 33 and 43 are connected at their gates to the sources of the FETs 22, 32 and 42 and their sources to constant current sources 25, 35 and 45, respectively. The outputs OUT1, OUT2 and OUT3 are delivered from the sources of the transistors 23, 33 and 43, respectively.

Buried channel FETs 51, 52 and 53 are connected at their drains to the sources of the FETs 22, 32 and 42 and at their gates to the electrodes 41, 21 and 31 of the registers 4, 2 and 3, respectively. Thus, to the gates of the FETs 51, 52 and 53, the drive pulses $\phi 3$, $\phi 1$ and $\phi 2$ are supplied respectively. A buffer transistor 54 is connected at its gate to the sources of the FETs 51, 52 and 53 and at its source to a constant current source 55. The output OUT4 is delivered from the source of the transistor 54.

The transistor 51 to 54 and the current source 55 are formed on a silicon substrate (semi-conductive body) of the CCD image pickup element together with the transistors 22, 23, 32, 33, 42 and 43 and the current sources 24, 25, 34, 35, 44 and 45. These transistors 51 to 54 and the current source 55 can be formed on the silicon substrate by the same technic as that for forming the transistors 22, 23, 32, 33, 42 and 43 and the current sources 24, 25, 34, 35, 44 and 45 on the silicon substrate. And the semiconductive structure of each output part or stage including the elements FD1, D and 22 to 25; FD2, D and 32 to 35; and FD3; D and 42 to 45 of each shift register 2; 3; and 4 is the same as that of the output part or stage of the charge transfer register of a conventional CCD image pickup device.

The elements 22 to 25, 32 to 35 and 42 to 45 constitute first read-out or output means or read-out channels for separately reading out for outputting the signals of the respective groups (R, G and B) of the cells, while the elements 51 to 55 constitute second read-out or output means or a selecting or switching circuit for serially reading out or outputting the signals of the respective cells. The remainder of the device is as in FIG. 1.

In this embodiment, the CCD image pickup device is of single-phase drive type.

The operation of the embodiment of FIG. 4 will now be explained in connection with FIG. 6. Each time the three-phase drive pulses $\phi 1$, $\phi 2$ and $\phi 3$ shown in FIG. 6 are applied to the electrodes 21, 31 and 41, respectively, the charges are transferred by one bit in directions of the arrows shown under each of the shift registers 2, 3, and 4 in FIG. 4. When the charges are transferred to locations under the floating regions FD1, FD2 and FD3, the voltage levels at the sources of the FETs 22, 32 and 42 respectively change according to the amount of the charges under the floating regions FD1, FD2 and FD3. These voltage levels at the sources of the FETs 22, 32 and 42 are amplified by the transistors 23, 33 and 43, and are supplied as the outputs OUT1, OUT2 and OUT3, respectively, as shown in FIG. 6, from the sources of the transistors 23, 33 and 43. When the charges are further transferred from under the floating regions FD1, FD2 and FD3 to the drains D, they are erased or cleared off through the drains D.

Figure 6:
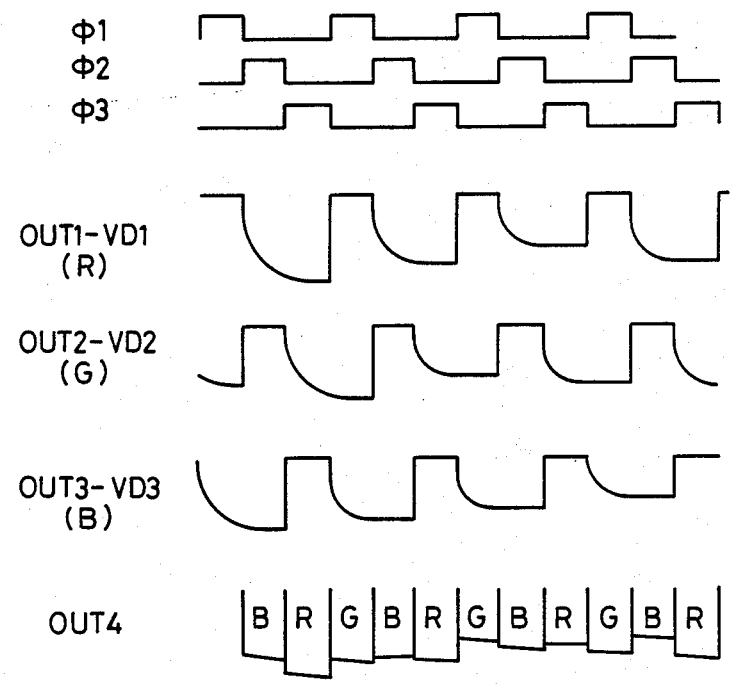
FIG. 6 is a timing chart showing the manner of operation of the system shown in FIG. 5.

On the other hand, since the drains of the FETs 51, 52 and 53 are respectively connected to the sources of the transistors 23, 33 and 43 and also the drive pulses $\phi 3$, $\phi 1$ and $\phi 2$ are respectively applied to the gates of the FETs 51, 52 and 53, the video signals VD1, VD2 and VD3 respectively corresponding to the outputs OUT1, OUT2 and OUT3 are selectively supplied as the output OUT4 through the transistor 55 in a condition having a 240° phase difference relative to the drive pulses $\phi 1$, $\phi 2$ and $\phi 3$, respectively, as shown in FIG. 6.

Figure 5:
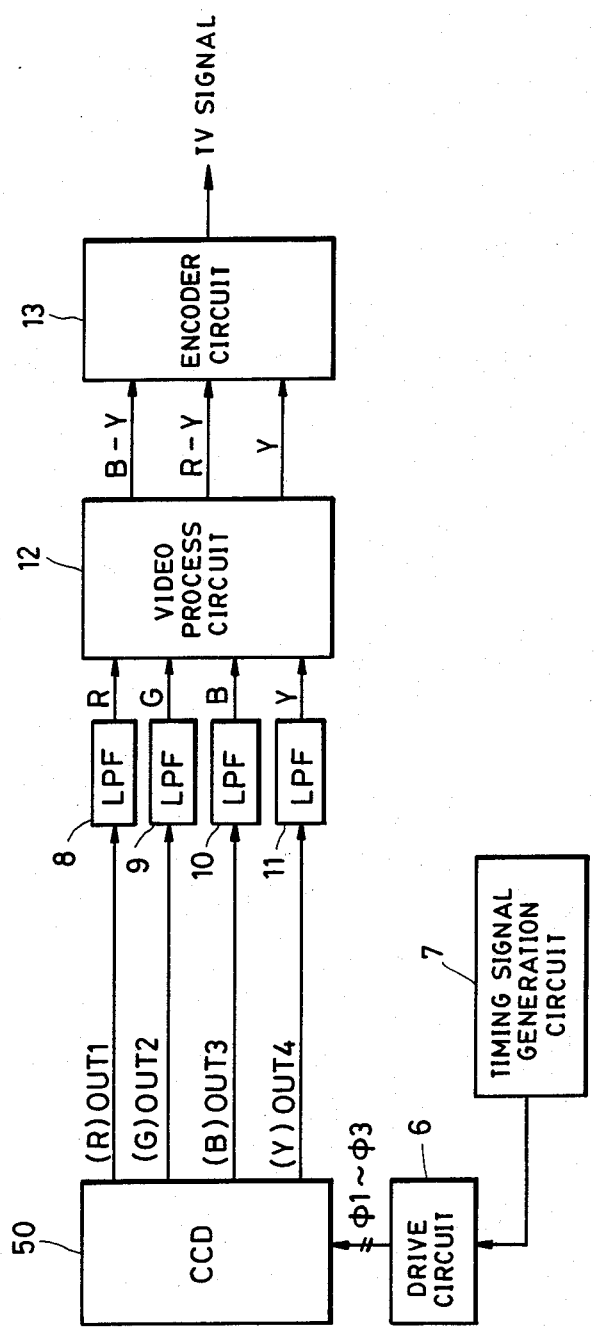
FIG. 5 is a block diagram of an image pickup system according to the present invention and using the pickup device shown in FIG. 4.

In FIG. 5, there is shown an embodiment of the image pickup system using the image pickup device shown in FIG. 4. In FIG. 5, the circuit elements indicated by the same reference numerals as in FIG. 2, are the same circuits as in the circuit system shown in FIG. 2.

In FIG. 5, the CCD image pickup device 50 has the construction described above with reference to the FIG. 4. The pickup element 50 produces the output OUT4 together with the outputs OUT1, OUT2 and OUT3. These outputs OUT1 to OUT4 are input to the video process circuit 12 through the low-pass filters 8 to 11.

As will be understood from the foregoing, the present invention in one aspect makes it possible to maintain in good order the timing relationship between the signals read out through the first read-out means from the respective groups of the radiation sensitive cells separately and the signals read out through the second read-out means from the respective cells serially, irrespective of temperature changes or voltage changes in the control of drive signal, since both of the first and the second read-out means are formed in or on a single semi-conductive body. Also, the present invention in another aspect makes it possible to maintain in good order the said timing relationship since it is possible to eliminate the time delay of the control or drive signal in the circuit by driving or controlling the first and second read-out means with common signals.

It will be understood that the present invention is not to be restricted to the disclosed embodiments; and many modifications would be possible without departing from the scope of the invention, which is defined in the appended claims.

We claim:

1. An image pickup device comprising:
   (A) a plurality of radiation sensitive cells each formed in or on a semi-conductive body and each for generating an electrical signal in response to received radiation, said cells being divided into plural groups;
   (B) first read-out means formed in or on said semi-conductive body responsive to control signals for separately reading out from the semi-conductive body the signals from the respective groups of said cells wherein said first read-out means includes plural read-out channels respectively corresponding to said radiation sensitive cell groups, each read-out channel being driven by a different control signal, each channel including a control electrode;
   (C) second read-out means formed in or on said semi-conductive body and responsive to said control signals for alternately reading out the signals from said plural groups, wherein said second read-out means has selection switches, each having a control electrode, one common output and individual inputs of said selection switches being respectively connected to outputs of said read-out channels; and
   (D) control signal path means for supplying said control signals both to said first and to said second read-out means, wherein said signal path means includes plural control signal paths formed in or on said semi-conductive body and each connected to one of the control electrodes of said read-out channels and to one of the control electrodes of said selection switches for simultaneously supplying one of said control signals.

2. An image pick up device according to claim 1, wherein each of said read-out channels includes a CCD.

3. An image pickup device according to claim 1, wherein each of said read-out channels has an output terminal for outputting each signal separately from said semi-conductive body.

4. An image pick up device according to claim 1, further comprising an output terminal for outputting signals outputted from said common output, from said semi-conductive body.

5. An image pick up device according to claim 1, further comprising a color filter arrangement having a plurality of different color filter portions and arranged with respect to said radiation sensitive cells so that each group of cells receives one of a plurality of different colored radiations.

6. An image pick up device according to claim 5, wherein said color filter portions include red, green, and blue portions.

7. An image pick up device according to claim 1, further comprising storage means for storing signals of said cells.

8. An image pick up device according to claim 7, wherein said storage means is disposed between said cells and said first read-out means.

* * * * *

UNITED STATES PATENT AND TRADEMARK OFFICE
CERTIFICATE OF CORRECTION

PATENT NO. : 4,887,160

DATED : December 12, 1989

INVENTOR(S) : Kinoshita, et al.

It is certified that error appears in the above-identified patent and that said Letters Patent is hereby corrected as shown below:

[54] Title:

"IMAGE-PICKUP" should read --IMAGE PICKUP--.

[56] References Cited:

Under "U.S. PATENT DOCUMENTS",

As continued (in 2nd column), in line 9,

"4,737,854  4/1958  Tandon et al." should read --4,737,854  4/1988  Tandon et al.--.

COLUMN 1:

Line 1, "IMAGE-PICKUP" should read --IMAGE PICKUP--.

COLUMN 2:

Line 68, "off" should read --of--.

COLUMN 3:

Line 51, "to an applied" should read --to applied--.

Line 66, "outer" should read --other--.

UNITED STATES PATENT AND TRADEMARK OFFICE
CERTIFICATE OF CORRECTION

PATENT NO. : 4,887,160                                      Page 2 of 2
DATED      : December 12, 1989
INVENTOR(S): Kinoshita, et al.

It is certified that error appears in the above-identified patent and that said Letters Patent is hereby corrected as shown below:

COLUMN 5:

Line 39, "CCd imager" should read --CCD imager--.

Line 65, "generating" should read --generation--.

COLUMN 7:

Line 4, "transistor" should read --transistors--.

Line 21, "for" should read --or--.

Signed and Sealed this

Second Day of April, 1991

Attest:

HARRY F. MANBECK, JR.

Attesting Officer         Commissioner of Patents and Trademarks